Dec. 19, 1950   J. F. H. DOUGLAS ET AL   2,534,423
BRAKING SYSTEM FOR INDUCTION MOTORS
Filed July 22, 1944   2 Sheets-Sheet 2

Inventors.
John F. H. Douglas
Eric Pell
Edwin W. Seeger
By Frank ...
Attorney

Patented Dec. 19, 1950

2,534,423

UNITED STATES PATENT OFFICE 2,534,423

BRAKING SYSTEM FOR INDUCTION MOTORS

John F. H. Douglas, Milwaukee, Eric Pell, Shorewood, and Edwin W. Seeger, Wauwatosa, Wis., assignors to Cutler-Hammer, Inc., Milwaukee, Wis., a corporation of Delaware Application July 22, 1944, Serial No. 546,182

15 Claims. (Cl. 318—203)

This invention relates to braking systems for induction motors and while not limited thereto is especially advantageous where such a motor is used for hoisting and lowering loads of widely varying values.

Numerous braking systems for such motors have been proposed having for their objective speed torque curves closely approaching those obtainable with a direct current motor, and the objectives of the present invention include that aforementioned.

More specifically the present invention has among its objects to obtain the desired speed torque curves for an induction motor subjected to drive by an overhauling load, through supply to the motor primary of direct current and through control of such supply.

Another object is to obtain certain steps of control through connection of the motor primary to both D. C. and A. C. supply sources.

Another object is to provide a control system wherein the supply of direct current for dynamic braking is obtained as a function of rotation of the controlled motor thus to obtain the dynamic braking action of the motor even upon failure of line voltage.

Various other objects and advantages of the invention will hereinafter appear.

The accompanying drawing illustrates one embodiment of the invention which will now be described, it being understood that the embodiment illustrated is susceptible of various modifications without departing from the scope of the appended claims.

Figure 1:
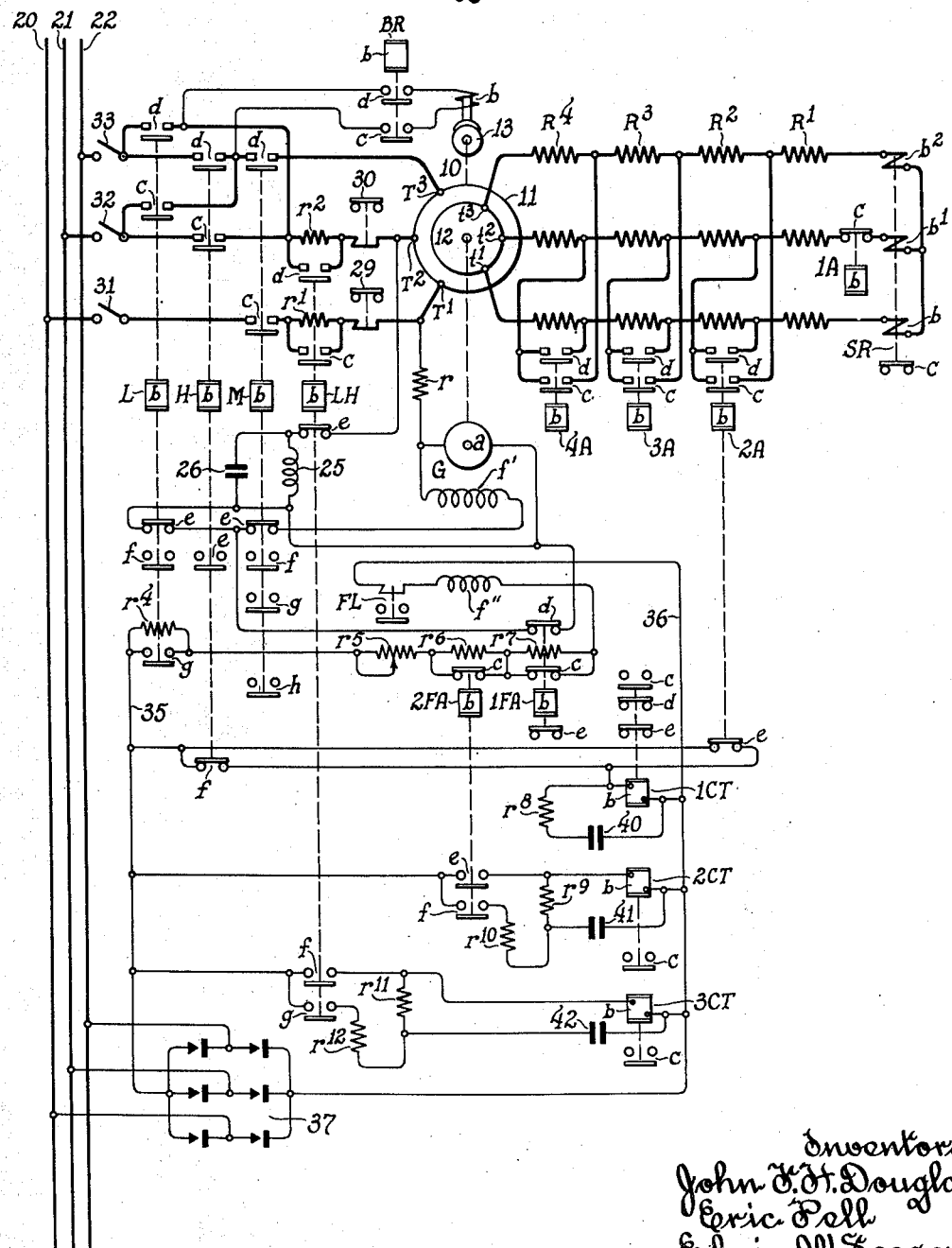
Figure 1 is a diagrammatic view showing the controlled motor, a generator, circuits for both and the electromagnetic switches used for control of such circuits and others.

Referring to Fig. 1, the same shows a motor $10$ having a stator $11$ and a rotor $12$. The rotor $12$ has connected thereto the drum of a brake $13$ and the armature $a$ of a direct current generator G. As will be understood, the generator armature may be connected to the rotor of the motor in any preferred manner, a direct connection being indicated for simplicity of illustration. The generator G has a field winding $f'$ by which it is rendered self-exciting and a separately excited field winding $f''$.

The motor stator or primary $11$ has terminals $T^1$, $T^2$ and $T^3$ to be connected to an alternating current supply circuit comprising lines $20$, $21$ and $22$, through the medium of an electromagnetic main switch M in conjunction with an electromagnetic hoist switch H, or alternatively in conjunction with an electromagnetic lowering switch L. On the other hand, the motor terminal $T^1$ has a connection through a resistance $r$ to one terminal of the generator armature $a$ while the motor terminal $T^2$ is adapted to be connected to the opposite terminal of the generator armature through contacts of an electromagnetic switch LH. The connection between motor terminal $T^2$ and the generator armature preferably includes a reactor $25$ to prevent any appreciable flow of alternating current in said connection. The reactor $25$ may be paralleled by a capacitor $26$ to further reduce the A. C. component in the generator circuit. On the other hand, the connections of motor terminals $T^1$ and $T^2$ with the alternating current supply preferably include resistances $r^1$ and $r^2$ respectively, to prevent any appreciable flow of direct current from the generator G to the alternating current supply source, said resistance being under the control of switch LH, to be short-circuited when said switch is energized to interrupt the connection between motor terminal $T^2$ and the generator.

The secondary or rotor of motor $10$ has terminals $t^1$, $t^2$ and $t^3$ connected with series resistors comprising as illustrated four groups $R^1$, $R^2$, $R^3$ and $R^4$. The outside resistors of group $R^1$ are permanently connected together through windings of a series relay switch SR and are connected to the intermediate resistor through another winding of series relay SR and an electroresponsive switch $1A$. As will be understood, the purpose of the phase interruption provided by switch $1A$ is to afford a low torque slack cable takeup. The resistors of groups $R^1$, $R^2$ and $R^3$ are adapted to be short-circuited by electroresponsive switches $2A$, $3A$ and $4A$, respectively.

The winding of brake $13$ is under the control of an electroresponsive switch BR. Other switches associated with the motor comprise overload switches $29$ and $30$ having their windings in series with motor terminals $T^1$ and $T^2$, respectively, and knife switches $31$, $32$ and $33$ in series with motor terminals $T^1$, $T^2$ and $T^3$, respectively.

The separately excited field winding $f''$ of the generator is connected across a D. C. circuit 35—36 deriving its current from the A. C. supply lines through a rectifier 37. In series with said generator field winding $f''$ are resistors $r^4$, $r^5$, $r^6$ and $r^7$. The resistor $r^4$ is adapted to be short-circuited by auxiliary contacts of switch L, while resistors $r^7$ and $r^6$ are under the control of electroresponsive switches 1FA and 2FA, respectively. Also the generator field winding $f''$ has in series therewith the winding of a so-called field failure relay FL.

The additional field winding $f'$ of the generator is preferably of the shunt type, being connected across the generator armature through contacts of main switch M and contacts of the switches 1FA and L in parallel.

Fig. 1 shows for controlling certain of the aforementioned electromagnetic switches, inductive time element relays 1CT, 2CT and 3CT to be energized by current from the D. C. circuit 35—36. The relay 1CT is under the control of contacts of electroresponsive switches H and 2A, relay 2CT being under the control of contacts of electroresponsive switch 2FA and relay 3CT being under the control of contacts of electroresponsive switch LH. The winding $b$ of relay 1CT is paralleled by a resistor $r^8$ and a capacitor 40. The winding $b$ of relay 2CT has a shunt including a resistor $r^9$ and a capacitor 41, said shunt at a point between said resistor and capacitor having a connection including a resistor $r^{10}$ to enable quick charging of condenser 41 and relay 3CT has similarly associated therewith resistors $r^{11}$ and $r^{12}$ and a capacitor 42.

Main switch M has an operating winding $b$, normally disengaged main contacts $c$ and $d$, normally engaged auxiliary contacts $e$ and normally disengaged auxiliary contacts $f$, $g$ and $h$. Hoisting switch H has an operating winding $b$, normally disengaged main contacts $c$ and $d$, normally disengaged auxiliary contacts $e$ and normally engaged auxiliary contacts $f$. Lowering switch L has an operating winding $b$, normally disengaged main contacts $c$ and $d$, normally engaged auxiliary contacts $e$ and normally disengaged contacts $f$ and $g$, contacts $g$ controlling a shunt for resistor $r^4$. Switch LH has an operating winding $b$, normally disengaged main contacts $c$ and $d$, normally engaged contacts $e$, and normally disengaged contacts $f$ and $g$. Brake switch BR has an operating winding $b$ and normally disengaged main contacts $c$ and $d$. The series relay switch SR is connected in the three phases of the motor secondary windings $b$, $b^1$ and $b^2$, respectively, and has normally engaged contacts $c$. Switch 1A has an operating winding $b$ and a single set of normally engaged contacts $c$. Each of the switches 2A, 3A and 4A has an operating winding $b$, normally disengaged main contacts $c$ and $d$, and switch 2A has normally engaged auxiliary contacts $e$. Brake 13 has a releasing winding $b$. Each of the switches 1FA and 2FA has an operating winding $b$, and normally engaged main contacts $c$, switch 1FA also having normally engaged contacts $d$ and $e$, and 2FA normally disengaged contacts $e$ and $f$. Relay 1CT has normally disengaged contacts $c$ and normally engaged contacts $d$ and $e$, while each of relays 2CT and 3CT has only a single set of contacts $c$ normally disengaged. The circuits for the aforementioned contacts not shown connected in Fig. 1 will be found in Fig. 2.

Figure 2:
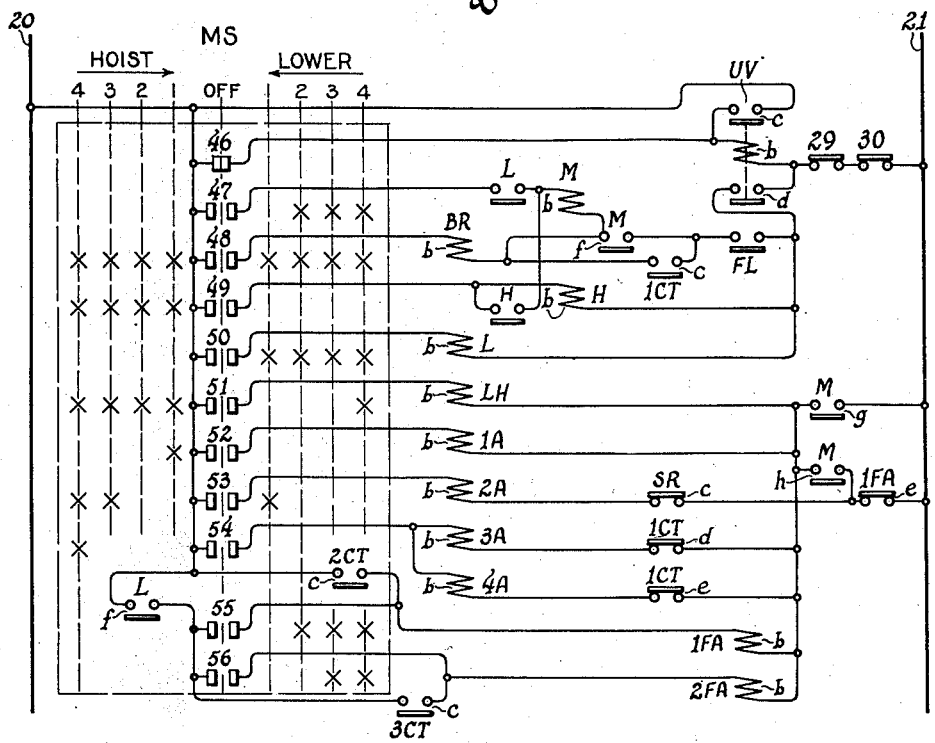
Fig. 2 is a diagrammatic view of the control for the electromagnetic switches shown in Fig. 1.

Referring to Fig. 2, the same shows the windings of all aforementioned electroresponsive switches under the control of a master switch MS, schematically illustrated as of the drum type and having associated therewith a low voltage relay UV. The drum comprises contacts 46 engaged in the off position and contacts 47 to 56 which are disengaged in the off position. The contacts 46 are disengaged in all hoisting and lowering positions of the drum, while the contacts 47 to 56 are respectively closed in the positions indicated by crosses, being disengaged in all other positions of the drum. Thus for example contacts 47 are engaged in lowering positions 2, 3 and 4, but are disengaged in all other positions of the drum. The low voltage relay UV has an operating winding $b$ and normally disengaged contacts $c$ and $d$. This relay is shown as provided with well known connections and functions in a well known manner in the off position of the master switch. The contacts 46 connect the winding $b$ of said relay across the A. C. circuit comprising extensions of lines 20 and 21, through the contacts of overload relays 29 and 30 and when relay UV responds its contacts $c$ shunt the contacts 46. Relay UV thus remains closed pending an abnormal drop in voltage, or momentary opening of overload contacts 29 and 30.

Figure 3:
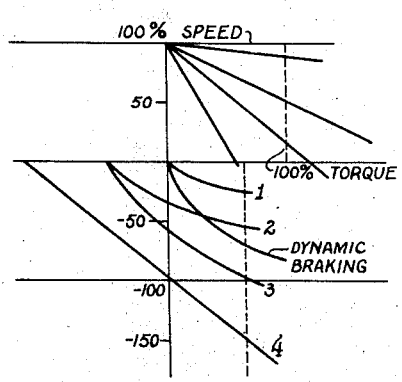
Fig. 3 shows certain characteristic curves of the controlled motor.

The hoisting control afforded by the means illustrated and described is in general well known, affording the speed torque curves shown in the upper portion of Fig. 3, and hence will not be described in detail. Speed regulation in hoisting is obtained with balanced primary voltage and by commutation of the resistance of the secondary circuit, slack cable takeup being provided for upon energizing switch 1A. In connection with the hoisting cycle it is desired to point out that in the first hoist position contacts 51 of the drum are engaged to connect the winding $b$ of switch LH across lines 20 and 21 through auxiliary contacts $g$ of main switch M to cause response of switch LH to interrupt the connection between motor terminal $T^2$ and generator G, and to short-circuit resistors $r^1$ and $r^2$ in the motor primary circuit, there being no need for these resistors while the generator G is thus disconnected from the motor.

Upon return of the master switch from any hoisting position to off position the brake 13 is of course released to set. Also switch LH is deenergized to reinsert resistors $r^1$ and $r^2$ in the motor primary connections and to reconnect motor terminal $T^2$ to the generator G. Also if relay 1CT has been deenergized it will now be again energized by the parallel connections through the contacts $f$ of switch H and the contacts $e$ of switch 2A. This prepares the controller for the lowering cycle, it being understood that when the motor rotates in lowering it drives generator G to supply direct current to the motor terminals $T^1$ and $T^2$, the current thus supplied increasing with increase in speed of the motor. Here it should be noted (see Fig. 1) that with switches M, L and 1FA deenergized, as is the case in the off position of the master switch, generator field winding $f'$ is connected across the generator armature through contacts $e$ of switch M and parallel contacts $e$ of switch L and $d$ of switch 1FA, the generator field winding $f''$ and the winding of relay FL being permanently connected across the D. C. circuit 35—36 for energization at all times except when power fails.

Figure 4:
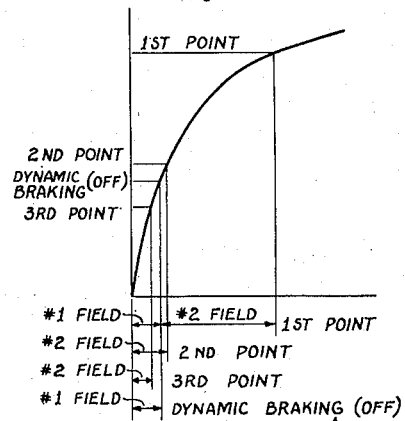
Fig. 4 shows the flux curve of the aforementioned generator.

In the first lowering position of the master switch, contacts 48, 50 and 53 are engaged to connect with line 20 the windings of brake switch BR, the lowering switch L and the switch 2A, as will be apparent from Fig. 2. Then if the contacts $d$ of relay UV and the contacts of the overload switches 29 and 30 are engaged the energizing circuit for switch L will be completed to line 21 and said switch will respond. So also if contacts $c$ of relay 1CT and the contacts of relay FL are engaged the energizing circuit of brake switch BR will be complete and said switch will respond. As switch L is also now energized the brake 13 is released to allow the motor to rotate under an overhauling load, but it will be noted from Fig. 1 that failure of switch L to respond prevents energization of the brake winding. Assuming the contacts of the series relay SR to be engaged then these contacts together with the contacts $e$ of switch 1FA complete the circuit of the winding of switch 2A to line 21, causing said switch to respond. As heretofore explained, switch 2A short-circuits the group $R^1$ of the resistors in the secondary circuit, this step preferably providing for about a 50% reduction in the resistance of the secondary circuit, and assuming rotation of the motor under an overhauling load the generator G is driven to supply direct current to the motor terminals $T^1$ and $T^2$ for dynamic braking action of the motor. As indicated in Fig. 4, both generator field windings $f'$ and $f''$ are now excited, the control for winding $f''$ being set for full field strength and with a resultant field flux curve, as depicted in Fig. 4, the first lowering point will afford the motor the control depicted by curve 1 of Fig. 3. In this connection it will be noted that the resistors $r^6$ and $r^7$ in circuit with the field winding $f''$ are short-circuited by the deenergized switches 2FA and 1FA, respectively, while the resistor $r^4$ is short-circuited by the auxiliary contacts $g$ of the now energized switch L.

Movement of the master switch to the second lowering position engages contacts 47 to energize the main switch M, thereby to connect the motor primary to the alternating current supply lines. Also response of switch M through disengagement of its contacts $e$ disconnects from circuit the generator field winding $f'$ to weaken the generator field strength. Furthermore the master switch in its second lowering position energizes winding $b$ of switch 1FA which responds to insert resistance $r^7$ in circuit with the generator field winding $f''$ with consequent additional weakening of the generator field strength, as indicated in Fig. 4. Also movement of the master switch to the second lowering position deenergizes switch 2A thereby to include all resistance in the motor secondary circuit. With the motor primary thus subjected to the potential of the alternating current lines and still supplied with direct current by the generator G it is possible to obtain a speed torque curve like curve 2 of Fig. 3. This speed torque curve may be considered as composed of a positive A. C. driving torque and a D. C. braking torque, the former torque decreasing with speed to zero at synchronism, and the latter torque increasing with speed from zero to standstill, as indicated by curve 1. As will be noted from Fig. 2, the circuit from the winding $b$ of switch 1FA to line 20 through master switch contacts 55 includes contacts $f$ of lowering switch L, said winding being connected to line 21 through contacts $g$ of main switch M.

Movement of the master switch to the third lowering position engages its contacts 56 to connect the winding $b$ of switch 2FA to line 20 through the contacts $f$ of switch L, thus paralleling said winding with the winding of switch 1FA. Switch 2FA is thus rendered responsive to short-circuit resistance $r^6$ to further weaken the field and voltage of the generator G, as indicated in Fig. 4. This is equivalent to a reduction in the braking torque and results in a speed torque characteristic depicted by curve 3 of Fig. 3.

Movement of the master switch to its fourth lowering position effects engagement of its contacts 51 to complete circuit from line 20 to and through the winding $b$ of switch LH and thence through the contacts $g$ of main switch M to line 21. Thus switch LH is made responsive to interrupt the D. C. supply to the motor from the generator G, leaving the motor with full balanced voltage impressed upon its primary. With the same 100% secondary resistance the speed torque characteristic will be that depicted by curve 4 of Fig. 3.

If now the master switch be returned to lowering position 1 it deenergizes the main switch M, terminating the alternating current supply to the motor, first deenergizing switch LH to again supply D. C. braking current to the motor and to reinsert the resistors $r^1$ and $r^2$ in the motor primary circuit. Also deenergization of switch LH tends to deenergize relay 3CT previously energized by response of switch LH to establish a maintaining circuit for the switch 2FA, paralleling the contacts 56 of the master switch. However, the connections for the winding of the relay 3CT afford an inductive time element in opening but after lapse of such time element said relay opens to deenergize switch 2FA to increase the field strength of the generator through short-circuiting of resistance $r^6$. Also switch 2FA when deenergized tends to deenergize relay 2CT, previously energized upon response of switch 2FA to parallel the master switch contacts 55 and contacts $f$ of switch L. However, relay 2CT also has an inductive time element in opening but after the lapse of such time element it deenergizes switch 1FA to further increase the field strength of the generator by short-circuiting resistance $r^7$. Also switch 1FA through its contacts $d$ closes the circuit of the generator field winding $f'$ and through reclosure of its contacts $e$ energizes switch 2A to again reduce the resistance of the secondary circuit, thus re-establishing conditions to afford the speed torque curve 1 of Fig. 3.

Should the master switch be moved from the fourth lowering position to the off position the same sequence of control would be afforded, but in addition the brake switch BR would be deenergized, causing release of the brake 13 for setting thereof.

In the event of power failure during lowering, dynamic braking is nevertheless obtained because of the provision for self-excitation of the generator when its field winding $f'$ is connected as would be the case upon failure of power. The field winding $f''$ would under such conditions contribute to dynamic braking only to the extent of the residual strength thereof. Failure of power of course not only deenergizes the switches LH and M to re-establish the generator connections but also results in deenergizing all other previously energized switches for setting of the brake 13 and for restoration of starting conditions. With power failure and also failure of the electro-mechanical brake 13 the motor of course will not be stopped by dynamic braking but its speed will be limited to some safe value, depending on the load, as indicated by the dynamic braking torque characteristic depicted in Fig. 3.

Here it should be noted that the resistors $r^1$ and $r^2$ in series with the terminals $T^1$ and $T^2$, respectively, not only serve to function as aforestated but also function to unbalance the motor primary when supplied with alternating current in lowering positions 2 and 3 and to regulate the torque for kick-off in positions 2 and 3. Thus by varying the resistors $r^1$ and $r^2$ the kickoff torque in positions 2 and 3 may be varied, but of course the range of variation is limited by need of resistance values effective for the function of the resistors earlier set forth.

As will be understood, the generator G instead of being employed to both supply and control the motor, might be employed only to control the field excitation of an independently driven generator to be electrically connected to the motor by switch LH. Also as will be understood, the generator driven by the controlled motor might then have a separately excited field winding under the control of field controlling means such as shown, whereas alternatively the field of the independently driven generator might be placed under the control of said field controlling means, the directly driven generator being made self-exciting and being used only for dynamic braking in the event of failure of power.

While the aforementioned variations contemplate only one field winding for the directly driven generator, said generator might have the two field windings shown and the same control means for its separately excited field, thus to equip it to supply field current for the independently driven generator supplying the motor and also to equip it to provide dynamic braking current upon failure of power. On the other hand, where dynamic braking in the event of failure of power is not essential and a drooping tendency of the speed torque curves is not objectionable, an independently driven generator with a separately excited field controlled as shown might alone be used to supply and control the direct current desired for the controlled motor.

Although the embodiment illustrated involves balanced primary voltage for the motor it is to be understood that the invention herein set forth is applicable also to systems providing for unbalancing of the motor primary voltage. Also it is to be understood that the generator exciting means may comprise in lieu of the means shown saturable reactors saturated by the load current, and that it is possible to use in lieu of a directly driven generator of the type shown, one having permanent field poles and to obtain the braking current control through use of secondary resistance. Also it is possible to use in lieu of a rotating generator, electronic means of the control grid type to both supply and control rectified current, the control of the rectified current through phase shifting or otherwise being made a function of the speed of the controlled motor.

What we claim as new and desire to secure by Letters Patent is:

1. In combination, an induction motor subjected to overhauling load conditions, a source of alternating current, means affording a direct current supply, and control means for connecting the primary of said motor to said alternating current source for causing said motor to exert torque in reverse directions selectively, said control means including means also affording connection of said motor primary selectively to said direct current supply means alone for dynamic braking or to both said direct current supply means and said alternating current source, with certain terminals of said motor primary each serving for both an alternating and direct current connection, to produce a torque of said motor and also to limit the speed of said motor under overhauling load conditions.

2. In combination, an induction motor subjected to overhauling load conditions, a source of alternating current, means affording a direct current supply, and control means for connecting the primary of said motor to said alternating current source for causing said motor to exert torque in reverse directions selectively, said control means including means also affording connection of said motor primary selectively to said direct current supply means alone for dynamic braking or to both said direct current supply means and said alternating current source, with certain terminals of said motor primary each serving for both an alternating and direct current connection, to produce a torque of said motor and also to limit the speed of said motor under overhauling load conditions, and said control means including means by which the torque and speed limit of said motor when supplied with both direct and alternating current, may be varied at will.

3. In combination, an induction motor, a source of alternating current, means affording a direct current supply variable with the speed of said motor, and control means for connecting the primary of said motor to said alternating current source for causing said motor to exert torque in reverse directions selectively, said control means including means also affording connection of said motor primary selectively to said direct current supply means alone for dynamic braking or to both said direct current supply means and said alternating current source to provide a torque of said motor and to limit the speed of said motor under overhauling load conditions.

4. In combination, an induction motor, a source of alternating current, means affording a direct current supply variable with the speed of said motor, and control means for connecting the primary of said motor to said alternating current source for causing said motor to exert torque in reverse directions selectively, said control means including means also affording connection of said motor primary selectively to said direct current supply means alone for dynamic braking or to both said direct current supply means and said alternating current source to provide a torque of said motor and to limit the speed of said motor under overhauling load conditions, and said control means including means for varying at will the direct current supply to said motor to vary the speed torque characteristic of said motor.

5. In combination, an induction motor, a source of alternating current, means to supply direct current as a function of rotation of said motor, and control means for connecting said motor to said alternating current source for causing said motor to exert torque in reverse directions selectively, said control means including means also affording connection of the motor primary to said direct current supply means alone for self supply and dynamic braking of said motor, or alternatively affording connection of said motor primary to both said direct current supply means and said alternating current source for producing torque of said motor and for limiting the speed of said motor under overhauling load conditions.

6. In combination, an induction motor, a source of alternating current, means to supply direct current as a function of speed and rotation of said motor, and control means for connecting said motor to said alternating current source for causing said motor to exert torque in reverse directions selectively, said control means including means also affording connection of the motor primary to said direct current supply means alone for self supply and dynamic braking of said motor, or alternatively affording connection of said motor primary to both said direct current supply means and said alternating current source for producing torque of said motor and for limiting the speed of said motor under overhauling load conditions, and said control means including means by which the motor torque and speed limit, when the motor is supplied with both direct and alternating current, may be varied at will.

7. In combination, an induction motor, a source of alternating current, means affording a direct current supply, and control means including switches and an element movable selectively in opposite directions from an off position for causing certain of said switches to connect the primary of said motor to said alternating current source for motor torque in reverse directions selectively, said element when moved to its first position in one direction causing certain of said switches to effect connection of said motor primary to said direct current supply means alone for dynamic braking and when moved further in the same direction causing certain of said switches to effect connection of said motor primary to both said direct current supply means and said alternating current source to produce torque of said motor and also to limit the speed of said motor under overhauling load conditions.

8. In combination, an induction motor, a source of alternating current, means affording a direct current supply, and control means including switches and an element movable selectively in opposite directions from an off position for causing certain of said switches to connect the primary of said motor to said alternating current source for motor torque in reverse directions selectively, said element when moved to its first position in one direction causing certain of said switches to effect connection of said motor primary to said direct current supply means alone for dynamic braking and when moved to a second position in the same direction causing certain of said switches to effect connection of said motor primary to both said direct current supply means and said alternating current source to produce torque of said motor and also to limit the speed of said motor under overhauling load conditions, said control means under the influence of said element when moved further in the same direction reducing and ultimately interrupting the supply of direct current to said motor while maintaining connection of said motor to said alternating current source.

9. In combination, an induction motor, a source of alternating current, a direct current generator driven by said motor, and control means for connecting the primary of said motor to said alternating current source for motor torque in reverse directions selectively, said control means including means also affording connection of said motor primary selectively to said direct current generator alone for dynamic braking or to both said direct current generator and said alternating current source to produce a torque of said motor and also to limit the speed of said motor under overhauling load.

10. In combination, an induction motor, a source of alternating current, a direct current generator driven by said motor, and control means for connecting the primary of said motor to said alternating current source for motor torque in reverse directions selectively, said control means including means also affording connection of said motor primary selectively to said direct current generator alone for dynamic braking or to both said direct current generator and said alternating current source to produce a torque of said motor and also to limit the speed of said motor under overhauling load, said generator having a plurality of field windings including a field winding excited by said generator and excluded from circuit by said control means when supplying said motor with alternating current in addition to direct current from said generator.

11. In combination, an induction motor, a source of alternating current, means affording a direct current supply, and control means for connecting the primary of said motor to said alternating current source while at the same time affording connection of certain terminals of the motor primary to said direct current supply means, said control means comprising for inclusion in the alternating current supply connections of said motor, resistors for such of said alternating current connections as lead to the motor terminals supplied with direct current, said resistors being external of the direct current connections of said motor.

12. In combination, an induction motor, a source of alternating current, means affording a direct current supply, and control means for connecting the primary of said motor to said alternating current source while at the same time affording connection of certain terminals of the motor primary to said direct current supply means, said control means comprising for inclusion in the alternating current supply connections of said motor, resistors for such of said alternating current connections as lead to the motor terminals supplied with direct current, said resistors being external of the direct current connections of said motor, and said direct current connections including a reactor external of said alternating current connections.

13. In combination, an induction motor, a source of alternating current, means affording a direct current supply, and control means affording connection of the motor primary to said alternating current source with certain terminals of the motor primary connected to said direct current supply means, said control means comprising resistors for such of the alternating current connections as lead to the motor terminals supplied with direct current, said resistors being external of the direct current connections, and said control means also comprising means to interrupt the direct current connections and to shunt said resistors while maintaining the alternating current connections of said motor.

14. In combination, an induction motor, a source of alternating current, means affording a direct current supply, and control means affording connection of the motor primary to said alternating current source with certain terminals of the motor primary connected to said direct current supply means, said control means comprising resistors for such of the alternating current connections as lead to the motor terminals supplied with direct current, said resistors being external of the direct current connections, and said control means also comprising means selectively to interrupt the alternating current connections or the direct current connections while maintaining the other of said connections and to shunt said resistors while said motor is connected to said alternating current source only.

15. In combination, an induction motor, an electrically controlled mechanical brake for said motor, an alternating current supply, a direct current generator operatively connected with said motor to be driven thereby, and control means to establish and interrupt connections between the primary of said motor and said alternating current source and between said electrically controlled brake and said source, said control means including means to effect release of said brake and to connect certain terminals of the motor primary to said direct current generator for dynamic braking action of said motor and slowdown of said motor without connection to said alternating current source, said generator being self-exciting and exciting the primary of said motor for reduction of the motor speed to a safe value without dependence upon other braking means or upon said alternating current source.

JOHN F. H. DOUGLAS.
ERIC PELL.
EDWIN W. SEEGER.

REFERENCES CITED

The following references are of record in the file of this patent:

UNITED STATES PATENTS

| Number | Name | Date |
| --- | --- | --- |
| 862,168 | James | Aug. 6, 1907 |
| 1,134,197 | Henderson | Apr. 6, 1915 |
| 1,539,839 | Hellmund | June 2, 1925 |
| 1,945,392 | Borden | Jan. 30, 1934 |
| 2,141,056 | Watkins | Dec. 20, 1938 |
| 2,193,642 | Parvin | Mar. 12, 1940 |
| 2,196,402 | Snyder | Apr. 9, 1940 |
| 2,227,467 | Sweeny | Jan. 7, 1941 |
| 2,280,991 | Wickerham et al. | Apr. 28, 1942 |
| 2,304,604 | Schweitzer | Dec. 8, 1942 |

FOREIGN PATENTS

| Number | Country | Date |
| --- | --- | --- |
| 518,476 | Great Britain | Feb. 28, 1940 |